G. WOLF.
Churn.

No. 52,103. Patented Jan'y 16, 1866.

Witnesses:
G. Breed
M. Breed

Inventor:
George Wolf
by Daniel Breed
atty.

UNITED STATES PATENT OFFICE.

GEORGE WOLF, OF WILLIAMSPORT, MARYLAND.

IMPROVEMENT IN CHURNS.

Specification forming part of Letters Patent No. 52,103, dated January 16, 1866.

*To all whom it may concern:*

Be it known that I, GEORGE WOLF, of Williamsport, in the county of Washington and State of Maryland, have invented a new and useful Improvement in Churns; and I do hereby declare that the following is a full and exact description thereof, reference being had to the accompanying drawings, and to the letters of reference marked thereon.

My invention consists in a peculiar construction of churn, provided with both a crank and a reciprocating lever for working the dasher.

Figure 1:
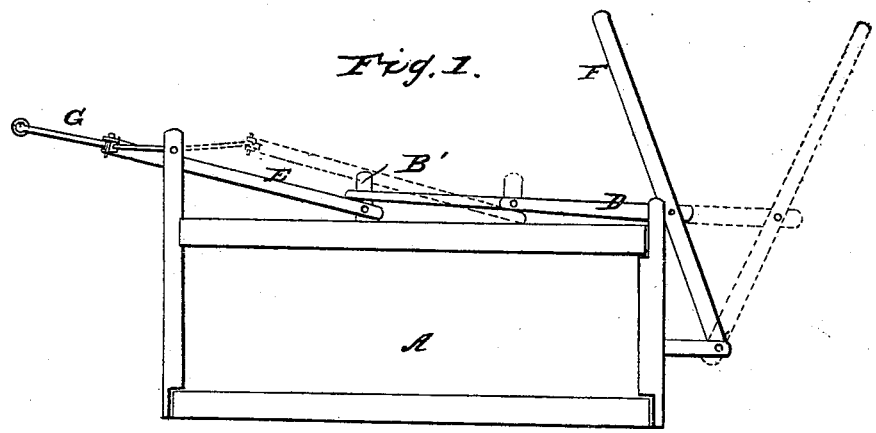
Figure 2:
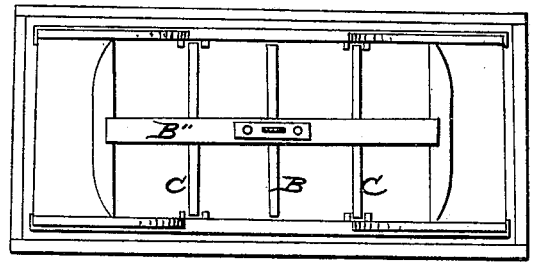
Figure 4:
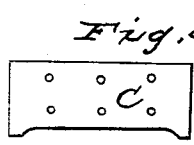
Figure 3:
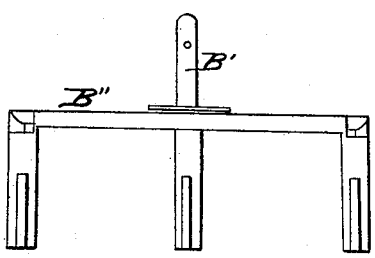
Figure 5:

In the accompanying drawings, Figure 1 is a side view of my churn, the motion of the lever and crank being indicated by red lines. Fig. 2 is a top view of the box and dashers, the cover being removed to show the inside of the churn. Figs. 3 and 5 are detached views of the dasher. Fig. 4 is a side view of one of the partitions of the box.

The box A of my churn should be well made, so that the corners and joints can be kept perfectly clean. The top or cover of the box should be removable and have a very narrow slot for the stem B' of the dasher to slide in. The cover may also have small windows for the inspection of the cream in order to know the progress of the work of churning. Across the box A are placed two removable partitions, C, dividing the box into three chambers. The dasher has three branches or beaters, B, one of which works in each chamber of the box. These beaters are all connected by a bar, B'', and thus attached to the stem of the dasher B', as is better seen in Fig. 3. Both the beaters and the partitions of the box have holes bored through them, as seen in Figs. 4 and 5.

Attached to the stem of the dasher are two connecting-rods, D and E, the former being worked by a lever, F, and the latter by a crank, G. As the dasher is moved forward and backward the beaters B give the cream three strokes at every motion or stroke of the stem B'', or six strokes at every revolution of the crank G, while the ends of the box and the partitions C give the same number of counter-strokes, thus churning with great rapidity.

A very important advantage of my churn is the use of both the crank G and lever F. By this simple arrangement the lever may be used part of the time, and when the hand and arm tire of such stroke or motion the lever may be left and the churn worked by the crank. Thus by changing it is much easier to complete the churning; or if from any infirmity it is painful to work the churn in one way, it may often be easy to work it in the other; or both the lever and crank may be employed at the same time by two small children, who, by often changing, may make a sort of play of what is often tiresome work.

Having thus fully described my invention, what I claim, and desire to secure by Letters Patent of the United States, is—

1. The above-described box-churn, divided into several compartments and provided with the separate beaters B, worked by either the lever or the crank, substantially as set forth.

2. The combination of the lever F and crank G, whether worked alternately or together, substantially as described.

GEORGE WOLF.

Witnesses:
EMANUEL BOMBERGER,
WM. STERNE.